(12) United States Patent
Castillo

(10) Patent No.: US 7,597,916 B2
(45) Date of Patent: Oct. 6, 2009

(54) LIVESTOCK ANTI-ACID COMPOSITION

(76) Inventor: Alejandro R. Castillo, 1439 Monte Grosso Ct., Merced, CA (US) 95340

( * ) Notice: Subject to any disclaimer, the term of this patent is extended or adjusted under 35 U.S.C. 154(b) by 247 days.

(21) Appl. No.: 11/534,092

(22) Filed: Sep. 21, 2006

(65) Prior Publication Data
US 2007/0065413 A1    Mar. 22, 2007

Related U.S. Application Data

(60) Provisional application No. 60/719,393, filed on Sep. 22, 2005.

(51) Int. Cl.
*A23K 1/175* (2006.01)
(52) U.S. Cl. .............................. 426/2; 426/62; 426/74; 426/623; 426/630; 426/635; 426/807
(58) Field of Classification Search .............. 426/2, 426/62, 74, 623, 630, 635, 807
See application file for complete search history.

(56) References Cited

U.S. PATENT DOCUMENTS

| | | | | |
|---|---|---|---|---|
| 4,784,851 A | * | 11/1988 | Rohwer | 424/687 |
| 4,888,185 A | * | 12/1989 | Miller | 426/72 |
| 4,904,473 A | * | 2/1990 | Schricker et al. | 424/438 |
| 5,534,271 A | * | 7/1996 | Ware et al. | 426/2 |
| 5,908,634 A | * | 6/1999 | Kemp et al. | 424/442 |

OTHER PUBLICATIONS

Hutjens, Michael F. Feed Additives, Western Large Herd Dairy Management Conference, pp. 168-174, 1993.*
Ondarza Mary Beth de. Feed Additives, downloaded from http://www.milkproduction.com/Library/Articles/Feed_Additives.htm, 10 pages, published 2003.*
Schroeder J.W. Feeding and Managing the Transition Dairy Cow, downloaded from http://www.ag.ndsu.edu/pubs/ansci/dairy/as1203w.htm, 10 pages, Mar. 2001.*
Enemark et al. Veterinarija ir Zootechnika T, vol. 20, No. 42, pp. 16-29, 2002.*
Alliance Nutrition Dairy's 'Feed Additives', downloaded from internet archives of http://web.archive.org/web/20031005094625/http://www.admani.com/allianceanimalhealth/ProsponseNutrium.htm, Oct 5, 2003, 3 pages.*

* cited by examiner

*Primary Examiner*—C. Sayala
(74) *Attorney, Agent, or Firm*—Fox Rothschild LLP

(57) ABSTRACT

Acid compositions for ruminants containing a plurality of acid-neutralizing salts with $pK_a$'s effective at different ruminant gastrointestinal pH ranges and an active probiotic culture capable of stimulating the growth and concentration of beneficial acid-consuming rumen microorganisms. Methods for preventing clinical and sub-clinical acidosis in ruminants with the acid-neutralizing salts and feed compositions to which the acid-neutralizing salts have been added are also disclosed.

19 Claims, No Drawings

LIVESTOCK ANTI-ACID COMPOSITION

CROSS-REFERENCE TO RELATED APPLICATIONS

The present application claims priority benefit under 35 U.S.C. §119(e) of U.S. Provisional Patent Application No. 60/719,393 filed Sep. 22, 2005, the entire contents of all of which are hereby incorporated by reference.

FIELD OF THE INVENTION

The present invention relates to anti-acid compositions formulated for ruminants, and in particular, for ruminants consuming high concentrates feed diets. More particularly, the present invention relates to anti-acid compositions that work in different ranges of acidity during the digestion process in the rumen and the ruminant intestine. The present invention also relates to methods for preventing clinical and sub-clinical acidosis in a ruminant with the anti-acid compositions of the present invention.

BACKGROUND OF THE INVENTION

Sub-clinical acidosis in ruminants produces losses in excess of 500 million dollars a year for the dairy industry in the United States by seriously affecting animal performance. Dry matter intake and lactation performance (milk yield, milk fat and protein) are negatively affected, increasing the incidence of laminitis.

The ideal rumen pH is between 5.8 and 6.8. A pH lower than 5.8 increases the risk of sub-clinical acidosis and below 5.5 is considered an acidosis condition. Animals may die when rumen pH falls below 5.0. Digestive enzymes in the small intestine are ineffective below pH 6.8.

Two situations are very well documented in which ruminants develop clinical and sub-clinical acidosis. Diets in intensive animal production systems (dairy or beef cattle) are very high in starch-rich concentrate feeds such as corn, barley, sorghum, oats, and the like and low in effective Neutral Detergent Fiber (NDF). High dietary starch and low effective NDF produce an acidic rumen environment as the result of low saliva production and a high rate of starch fermentation in the rumen, and, as a consequence, high concentrations of acids ($H^+$) are produced. This results in clinical and sub-clinical acidosis, which is characterized by high volatile fatty acid and lactic acid concentrations in the rumen.

The second situation arises with ruminants grazing high quality pastures with high rates of rumen fermentation (low effective NDF) and this type of forages are supplemented with high starch concentrates. This can also result in sub-clinical rumen acidosis.

Sodium bicarbonate is presently widely-used by feedlots and intensive dairy production systems as a ruminant anti-acid treatment to prevent sub-clinical acidosis. In addition to being expensive, the $pK_a$ of sodium bicarbonate is only effective to partially neutralize acids in the rumen and it will not neutralize acid in the intestine.

From the environmental point of view, sodium bicarbonate has high sodium content. This results in soil salinization and underground water contamination in intensive animal production systems.

There is a need for a commercial low-sodium anti-acid composition that includes different components that are integrated to work in the rumen and the ruminant intestine at different ranges of pH to prevent and control sub-clinical acidosis.

SUMMARY OF THE INVENTION

This need is met by the present invention. The present invention provides a natural anti-acid composition for ruminants consuming high concentrate diets that prevents clinical and sub-clinical acidosis and other nonspecific dysfunctions associated with the use of high energy diets in ruminants. The anti-acid composition works in different ranges of acidity during the digestion process in the rumen and the ruminant intestine. The components of the inventive composition have different $pK_a$'s, controlling or consuming hydrogen in a variety of pH ranges. The inventive composition also includes an active probiotic culture that stimulates the growth and concentration of beneficial microorganisms (fungi and lactic-acid utilizing bacteria) in the rumen and the ruminant intestine that prevent the accumulation of lactic acid.

Therefore, according to one aspect of the present invention, an anti-acid composition for ruminants is provided that is formulated with a plurality of acid-neutralizing salts with $pK_a$'s effective at different ruminant gastrointestinal pH ranges and an active probiotic culture capable of stimulating the growth and concentration of beneficial acid-consuming rumen microorganisms. The active probiotic culture preferably stimulates the growth and concentration of lactic acid consuming rumen microorganisms, and is preferably an active yeast culture. The active yeast culture is preferably a *Saccharomyces*, and even more preferably *Saccharomyces cerevisiae*.

According to one embodiment of this aspect of the invention, at least one acid neutralizing salt has a $pK_a$ effective to neutralize acids within the pH range of the rumen, and at least one acid neutralizing salt has a $pK_a$ effective to neutralize acids within the pH range of the ruminant intestine. Examples of acid neutralizing salts include sodium, calcium and magnesium carbonate, calcium and magnesium oxides, and sodium, calcium and magnesium phosphates. According to another embodiment of the present invention, the composition can also include an acid-absorbing inorganic material, examples of which include, bentonite, zeolite, and some others clays and volcanic ashes. Bentonite is a particularly useful acid-absorbing inorganic material because it also decreases the rate of passage of rumen digesta and increases fiber digestion.

Anti-acid compositions according to the present invention are administered by being mixed with other feeds, preferably grain concentrates. The compositions prevent the occurrence of acidosis rather than treat existing conditions. The present invention thus also provides methods for preventing clinical or sub-clinical acidosis in ruminant animals by feeding to the ruminant an acid neutralizing amount of the anti-acid composition of the present invention. Ruminants weighing over 100 kg are typically fed between about 25 and about 50 g of the anti-acid composition of the present invention per 100 kg of body weight. Ruminants weighing under 100 kg are typically fed between about 2.5 and about 10 g per 10 kg of body weight.

The present invention also includes a ruminant feed containing at least one vegetable material and between about 1 and about 2.5 wt % on a dry solids basis of the anti-acid composition of the present invention. About 1.2% by weight of the total dry matter intake or about 2% by weight of the total concentrate intake is preferred.

While the composition of the present invention was developed for ruminants (cows, goats, sheep, camels, llamas, giraffes, bison, buffalos, deer, antelope, etc.) consuming grain or concentrate diets, it also can be administered to non-ruminants fed high concentrate diets, which are also at risk for the development of clinical and sub-clinical acidosis. For example, elephants and horses, for different reasons (race preparation or illness recovery), are fed high grains or concentrate diets.

The anti-acid compositions of the present invention can thus also be used to prevent clinical and sub-clinical acidosis in non-ruminant animals fed concentrated diets, especially high value animals, such as race horses and zoo animals that do not tolerate high grain or low effective NDF diets. The present invention therefore also includes methods for treating clinical or sub-clinical acidosis in non-ruminant animals by feeding an acid neutralizing amount of the anti-acid composition of the present invention, as well as a non-ruminant feed containing at least one vegetable material and between about 1% and about 2.5% by weight on a dry solids basis of the anti-acid composition of the present invention.

The foregoing and other objects, features and advantages of the present invention are more readily apparent from the detailed description of the preferred embodiments set forth below.

DETAILED DESCRIPTION OF THE PREFERRED EMBODIMENTS

The anti-acid compositions of the present invention are dry fine powders that can be made by weighing and dry-mixing together the component quantities with any equipment suitable for uniformly mixing bulk quantities of dry powders. Such equipment is essentially conventional and readily available.

The anti-acid compositions are prepared by dry-blending a plurality of acid-neutralizing salts, wherein at least two of the salts have $pK_a$'s effective at different ruminant gastrointestinal pH ranges, together with an active probiotic culture capable of stimulating the growth and concentration of beneficial acid-consuming rumen microorganisms and any inorganic acid absorbing materials. The acid neutralizing salts make up at least two-thirds by weight of the composition, up to about 90 wt %. A level between about 75 and about 85 wt % is preferred.

It is possible to formulate the anti-acid compositions to create a product line capable of addressing different pH ranges of acidosis and dietary variations, such as the other mineral supplements being fed to livestock and the mineral salt content of the drinking water. The formulations will contain at least one acid neutralizing salt with $pK_a$ effective to neutralize acids within the pH range of the rumen and at least one acid neutralizing salt with a $pK_a$ effective to neutralize acids within the pH range of the ruminant intestine. Examples of acid neutralizing salts include sodium, calcium and magnesium carbonates, calcium and magnesium oxides, and sodium, calcium and magnesium phosphates. Sodium carbonates include sodium bicarbonate, sodium sesquicarbonate dehydrate and $NaHCO_3$.

Sodium bicarbonate is effective to neutralize acidic rumen pH. Calcium and magnesium carbonate are effective to neutralize acidic pH in the ruminant intestine. Magnesium oxide, inorganic acid absorbing materials and active probiotic cultures function to neutralize acidic pH in both the rumen and the ruminant untestine.

The compositions will contain between about 5 and about 15 wt %, preferably between about 8 and about 12 wt % and more preferably about 10 wt % of the active probiotic culture. The active probiotic culture preferably stimulates the growth and concentration of lactic acid consuming rumen microorganisms, and is preferably an active yeast culture. The active yeast culture is preferably a *Saccharomyces*, and even more preferably *Saccharomyces cerevisiae*. One example of a suitable *S. cerevisiae* yeast strain is the CNCM (Pasteur Institute) I-1077 strain of *S. cerevisiae*, which is commercially available as LEVUCELL SC® from Virtus Nutrition of Fairlawn, Ohio.

The compositions can also contain up to about 20 wt % of an acid-absorbing inorganic material, examples of which include bentonite, zeolite, and some other clays and volcanic ashes. An inorganic material level between about 10 and about 20 wt % is preferred, with a level of about 15 wt % being more preferred. Bentonite is particularly useful because it also increases fiber digestion and decreases the rate of passage of feeds through the rumen.

A typical formulation is depicted in Table I, together with the ranges within which individual components can be varied:

| Ingredient | International feed number | Proportion (wt %) ideal | range |
|---|---|---|---|
| 1. Dolomite limestone (magnesium) | 6-02-633 | 30 | 25-35 |
| 2. Sodium bicarbonate | 6-04-272 | 30 | 25-35 |
| 3. Bentonite (aluminum silicates) | NA | 15 | 12-18 |
| 4. Calcium carbonate limestone | 6-02-632 | 10 | 8-12 |
| 5. Yeast (*S. cerevisiae*) | NA | 10 | 8-12 |
| 6. Magnesium oxide | 6-02-756 | 5 | 4-6 |
| TOTAL | | 100 | |

The anti-acid compositions of the present invention may also be optionally formulated within a product line to include up to about 10 wt % of other mineral pre-mixes, mineral complexes, chelating or proteinated trace minerals (copper, manganese, selenium, cobalt and zinc) for specific feeding situations such as grazing on high quality pasture, high salt (and sulfur) content in drinking water, excessive manure production, heat stress, etc. Another optional ingredient, only for ruminants (and not for horses or other non-ruminants) is monensin, which is an ionophore antibiotic that functions primarily in the rumen by inhibiting certain bacteria (Gram+), thereby indirectly controlling rumen acidosis.

The anti-acid compositions of the present invention may be conveniently fed to a ruminant admixed with a conventional ruminant feed. The feeds are typically vegetable materials edible by ruminants, such as legume hay, grass hay, corn silage, grass silage, legume silage, corn grain, oats, barley, distiller's grain, brewer's grain, soya bean meal and cottonseed meal. Concentrates or grains are preferred. For animals in free stalls or dry lot pens, the anti-acid composition should be mixed with other ingredients in a Total Mixed Ration. The composition can be mixed with grains for supplementing grazing animals. Because of its characteristics (dry fine powder) it is not recommended to offer this product alone.

Desirably, the amount of the anti-acid composition a feed ration admixture does not exceed about 1.2 wt % of the dry solids content of the daily ration and is preferably between about 0.8 and about 1.6% of the dry solids content of the daily ration. There is no particular lower limit for the amount of the anti-acid composition to be added to the ruminant feed, although in practice amounts below about 0.6 wt % of the dry solids content are too small to provide significant beneficial effect.

For ruminants weighing over 100 kg (young or adult cows, etc.), between about 25 and about 50 g per 100 kg of body weight of the anti-acid composition should be administered, and preferably about 40 g per 100 kg of body weight or 2% of the total concentrate intake including grain content in the silage (e.g. corn). For ruminants weighing less than 100 kg (goats, sheep, deer, etc), from about 2.5 to about 10 g per 10 kg of body weight should be administered, and preferably about 5 g per 10 kg.

The anti-acid compositions are intended to be fed to ruminants and non-ruminants on a daily basis, preferably no less than 7 days a week. Administration should continue as long as the ruminant or non-ruminant is on a diet that places it at risk for developing clinical or sub-clinical acidosis.

Anti-acid compositions according to the present invention can be packaged in individual doses for expensive or ill animals (10, 40 or 80 g/bag) or in 5 and 25 kg bags for commercial livestock feedlot operations. Because this is a highly hygroscopic product including a live ingredient (yeast), it has to be protected from humidity and oxygen, and stored in fresh and dry environments.

By being lower in sodium content than sodium bicarbonate and, unlike sodium bicarbonate, being capable of neutralizing acids over the variety of pH ranges found in ruminant gastrointestinal systems, the present invention thus represents an improvement over the use of sodium bicarbonate for the prevention of clinical and sub-clinical acidosis in ruminant animals.

The description of the preferred embodiments should be taken as illustrating, rather than as limiting, the present invention as defined by the claims. Numerous combinations of the features set forth above can be utilized without departing from the present invention as set forth in the claims. The variations are not regarded as a departure from the spirit and scope of the invention, and all such modifications are intended to be included within the scope of the following claims.

What is claimed is:

1. An anti-acid composition for ruminants consisting essentially of:
   (a) between about 25 and about 35 wt % of at least one acid neutralizing salt with a $pK_a$ effective to neutralize acids within the pH range of the rumen comprising sodium bicarbonate;
   (b) an amount of at least one acid neutralizing salt with a $pK_a$ effective to neutralize acids within the pH range of the ruminant intestine selected from the group consisting of calcium carbonate, magnesium carbonate and dolomite;
   (c) between about 5 and about 15 wt % of an active probiotic culture capable of stimulating the growth and concentration of beneficial acid-consuming rumen microorganisms;
   (d) between about 5 and about 10 wt % magnesium oxide; and
   (e) an acid-absorbing inorganic material.

2. The composition of claim 1, wherein said active probiotic culture stimulates the growth and concentration of lactic acid consuming rumen microorganisms.

3. The composition of claim 2, wherein said active probiotic culture is an active yeast culture.

4. The composition of claim 3, wherein said active yeast culture is a *Saccharomyces cerevisiae*.

5. The composition of claim 1, further comprising at least one acid neutralizing salt selected from the group consisting of sodium carbonates and sodium, calcium and magnesium phosphates.

6. The composition of claim 1, wherein said acid neutralizing salts comprise between about two-thirds by weight and about 90% by weight of said composition.

7. The composition of claim 1, wherein said acid-absorbing inorganic material is selected from the group consisting of bentonite, zeolite, and volcanic ash.

8. The composition of claim 7, wherein said acid-absorbing inorganic material is bentonite.

9. The composition of claim 1, wherein said acid-absorbing inorganic materials are present at a level up to about 20 wt%.

10. The composition of claim 1, comprising between about 25 and about 35 wt% dolomite limestone, between about 25 and about 35 wt% sodium bicarbonate, between about 10 and about 20 wt% bentonite, between about 8 and about 12 wt% calcium carbonate, between about 8 and about 12 wt% *S. cerevisiae*, and between about 5 and about 10 wt% magnesium oxide.

11. The composition of claim 1, further comprising one or more mineral pre-mixes, mineral complexes, mineral chelates or proteinated trace minerals.

12. The composition of claim 1, further comprising an effective amount of monensin.

13. A method for preventing clinical or sub-clinical acidosis in ruminant animals comprising feeding a ruminant animal daily an acid neutralizing amount of the anti-acid composition of claim 1.

14. The method of claim 13, wherein said ruminant animal weighs over 100 kg and is fed between about 25 and about 50 g of said anti-acid composition per 100 kg of body weight.

15. The method of claim 13, wherein said ruminant animal weighs less than 100 kg and is fed between about 2.5 and about 10 g of said anti-acid composition per 10 kg of body weight.

16. A ruminant feed comprising at least one vegetable material and an effective amount of the anti-acid composition of claim 1.

17. The ruminant feed composition of claim 16, wherein said vegetable material is a grain or feed concentrate.

18. The composition of claim 1, wherein the dolomite limestone is in an amount between about 25 and about 35 wt%.

19. The composition of claim 1, wherein the magnesium oxide is in an amount between about 4 to about 6 wt%.

* * * * *